(12) United States Patent
Liu

(10) Patent No.: US 11,231,947 B2
(45) Date of Patent: Jan. 25, 2022

(54) METHOD AND APPARATUS FOR DETERMINING THE CAPACITY OF AN APPLICATION CLUSTER

(71) Applicant: Alibaba Group Holding Limited, Grand Cayman (KY)

(72) Inventor: Yuejia Liu, Hangzhou (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 925 days.

(21) Appl. No.: 15/769,050

(22) PCT Filed: Nov. 7, 2016

(86) PCT No.: PCT/CN2016/104837
§ 371 (c)(1),
(2) Date: Apr. 17, 2018

(87) PCT Pub. No.: WO2017/084505
PCT Pub. Date: May 26, 2017

(65) Prior Publication Data
US 2019/0065222 A1    Feb. 28, 2019

(30) Foreign Application Priority Data
Nov. 16, 2015  (CN) .......................... 201510784781.2

(51) Int. Cl.
*G06F 9/455*     (2018.01)
*G06F 9/50*      (2006.01)
*G06F 11/34*     (2006.01)

(52) U.S. Cl.
CPC ............ *G06F 9/455* (2013.01); *G06F 9/5061* (2013.01); *G06F 9/5077* (2013.01); *G06F 11/3457* (2013.01); *G06F 2209/503* (2013.01)

(58) Field of Classification Search
CPC ...... G06F 9/455; G06F 9/5061; G06F 9/5077; G06F 11/3457; G06F 2209/503
(Continued)

(56) References Cited

U.S. PATENT DOCUMENTS 5,675,739 A    10/1997 Eilert et al.
6,505,249 B1   1/2003 Rehkopf
(Continued)

FOREIGN PATENT DOCUMENTS

| CN | 102646062 A | 8/2012 |
| CN | 104182288 A | 12/2014 |
| CN | 104794058 A | 7/2015 |

OTHER PUBLICATIONS

International Search Report to corresponding International Application No. PCT/CN2016/104837 dated Feb. 6, 2017 (2 pages).
(Continued)

*Primary Examiner* — Justin C Mikowski
(74) *Attorney, Agent, or Firm* — James J. DeCarlo; Greenberg Traurig, LLP

(57) ABSTRACT

Provided in the disclosed embodiments are a method and an apparatus for obtaining a capacity of an application cluster. The method comprises: setting up a simulated application cluster to be tested, the simulated application cluster comprising at least two testing machines; performing an overall workload pressure testing on the test machines of the application cluster to obtain an average single-machine capability of the test machines; and calculating the application cluster capacity based on a total workload pressure of the application cluster and the average single-machine capability of the test machines. By setting up a simulated application cluster to be tested and performing an overall workload pressure test on multiple testing machines of the whole simulated application cluster, the disclosed embodiments can obtain a more accurate average single-machine (Continued)

capability of the machines that is closer to reality, thereby obtaining a more accurate capacity of the application cluster.

18 Claims, 8 Drawing Sheets

(58) Field of Classification Search
USPC .......................................................... 703/22
See application file for complete search history.

(56) References Cited

U.S. PATENT DOCUMENTS

| | | |
|---|---|---|
| 6,865,527 B2 | 3/2005 | Go et al. |
| 8,104,041 B2 | 1/2012 | Belady et al. |
| 8,782,130 B2 | 7/2014 | Wee et al. |
| 8,856,797 B1 | 10/2014 | Siddiqui et al. |
| 9,112,782 B2 | 8/2015 | Siddiqui et al. |
| 9,270,745 B2 | 2/2016 | Wee et al. |
| 9,448,824 B1 | 9/2016 | Fitzgerald et al. |
| 9,513,935 B2 | 12/2016 | Cardonha et al. |
| 9,547,534 B2 | 1/2017 | Dettori et al. |
| 9,571,347 B2 | 2/2017 | Siddiqui et al. |
| 9,612,876 B2 | 4/2017 | Li et al. |
| 9,626,295 B2 | 4/2017 | Park et al. |
| 9,817,699 B2 | 11/2017 | Stich et al. |
| 2013/0007753 A1 | 1/2013 | Jain |
| 2013/0185729 A1 | 7/2013 | Vasic et al. |
| 2015/0113120 A1 | 4/2015 | Jacobson et al. |
| 2016/0048415 A1 | 2/2016 | Sarma et al. |

OTHER PUBLICATIONS

Office Action to corresponding CN Application No. 201510784781.2 dated Nov. 29, 2019 (5 pages).

METHOD AND APPARATUS FOR DETERMINING THE CAPACITY OF AN APPLICATION CLUSTER

CROSS-REFERENCE TO RELATED APPLICATIONS

The application claims priority to Chinese Patent Application No. 201510784781.2, filed on Nov. 16, 2015 and entitled "METHOD AND APPARATUS FOR OBTAINING CAPACITY OF APPLICATION CLUSTER," and PCT Appl. No. PCT/CN16/104837, filed on Nov. 7, 2016, and entitled "METHOD AND DEVICE FOR OBTAINING CAPACITY OF APPLICATION CLUSTER," both of which are incorporated herein by reference in their entirety.

BACKGROUND

Technical Field

The disclosed embodiments relate to the field of computer technologies, and in particular, to methods and apparatuses for obtaining a capacity of an application cluster.

Description of the Related Art

When determining a capacity percentage for each application in an application cluster, it is first required to calculate the capacity of the application cluster itself. The "capacity" refers to the number of instances (or the number of machines) required by the application cluster. Currently, the capacity of an application cluster is usually calculated via human estimation or single-machine workload pressure testing.

When using human estimation, a desired capability or desired total workload pressure value of an application cluster and a capability of a single machine are estimated first. Then, the expected, desired capability (or the estimated total workload pressure value) is divided by the estimated capability of the single machine, so as to obtain an overall workload capacity of the application cluster. After capacities of all applications are obtained according to this method, a capacity percentage of each of the applications can be calculated.

When using one-machine workload pressure tests, a workload pressure testing tool is used to test a single machine to obtain a capability of the single machine. Then, a desired capability is divided by the capability of the single machine obtained through the one-machine workload pressure test to obtain the overall capacity of the application cluster.

In each method, the individual capabilities of the machine obtained through the above two methods will be affected by various external factors. Thus, the obtained values may be less reliable, further affecting the accuracy of the overall capacity of the application cluster. For example, when a one-machine workload pressure test is performed for an application, other Virtual Manufacturing (VM) resources of a host machine where a current VM is located are idle. As a result, the problem of overestimated capability of a machine may exist and large deviations in data may occur when the overall capacity of the applications is calculated using the expected capability. In addition, the transaction traffic model for a large-scale promotion is very different from the transaction traffic model in a normal state, and this is also a factor affecting the accuracy of capacity estimation.

SUMMARY

One objective of the disclosed embodiments is to provide a method for obtaining a capacity of an application cluster, aiming to improve the accuracy of an overall capacity of the application cluster. Accordingly, the disclosed embodiments further include an apparatus for obtaining a capacity of an application cluster to guarantee implementation and application of the above method.

In order to solve the above problems, the disclosed embodiments describe a method for obtaining a capacity of an application cluster, comprising: setting up a simulated application cluster to be tested, the simulated application cluster comprising at least two testing machines; performing an overall workload pressure testing on the test machines of the application cluster to obtain an average single-machine capability of the test machines; and calculating an application cluster capacity based on a total workload pressure of the application cluster and the average single-machine capability of the test machines.

In one embodiment, performing an overall workload pressure testing on the test machines of the application cluster to obtain an average single-machine capability of the test machines comprises: performing an overall workload pressure testing on the test machines of the application cluster according to a preset initial workload pressure value; adjusting the workload pressure value; and obtaining the average single-machine capability of the testing machines when the workload pressure value reaches a maximum value within a workload pressure value that triggers a rate limit threshold of the application cluster.

In one embodiment, adjusting the workload pressure value comprises reducing the workload pressure value according to a preset step length when the initial workload pressure value triggers the rate limit threshold of the application cluster.

In one embodiment, obtaining the average single-machine capability of the testing machines comprises reducing the capacity of the application cluster when a load capability of the application cluster reaches a capacity reduction threshold of auto scaling; and using an average query-per-second of the testing machines of the application cluster as the average single-machine capability of the testing machines when the capacity of the application cluster is reduced such that the load capability of the application cluster reaches a capacity expansion threshold of the auto scaling.

In one embodiment, reducing the capacity of the application cluster comprises gradually reducing the capacity of the application cluster according to a preset capacity reduction ratio.

In one embodiment, the method further comprises calculating a capacity percentage of a single application cluster within all of the application clusters after capacities of all the application clusters are obtained.

In one embodiment, the method further comprises adjusting the capacity of the application cluster according to a planned data-handling capability of the application cluster.

In one embodiment, the adjusting the capacity of the application cluster according to a planned data-handling capability of the application cluster comprises adjusting the capacity of the application cluster according to a ratio of the planned data-handling capability of the application cluster to the total workload pressure value of the application cluster.

In one embodiment, when there is one application cluster, the application cluster comprises at least two testing machines; and when there is more than one application cluster, a single application cluster thereof comprises at least one testing machine.

The disclosed embodiments further describe an apparatus for obtaining a capacity of an application cluster, comprising: a simulation unit, configured to set up a simulated application cluster to be tested, the simulated application cluster comprising at least two testing machines; a workload pressure test unit, configured to perform an overall workload pressure testing on the test machines of the application cluster to obtain an average single-machine capability of the test machines; and a capacity calculation unit, configured to calculate the application cluster capacity based on a total workload pressure of the application cluster and the average single-machine capability of the test machines.

In one embodiment, the workload pressure test unit comprises an initialization subunit, configured to perform an overall workload pressure testing on the test machines of the application cluster according to a preset initial workload pressure value; an adjustment subunit, configured to adjust the workload pressure value; and an acquisition subunit, configured to obtain the average single-machine capability of the testing machines when the workload pressure value reaches a maximum value within a workload pressure value that triggers a rate limit threshold of the application cluster.

In one embodiment, the acquisition subunit comprises a capacity reduction subunit, configured to reduce the capacity of the application cluster when a load capability of the application cluster reaches a capacity reduction threshold of auto scaling; and a determination subunit, configured to use an average query-per-second of the testing machines of the application cluster as the average single-machine capability of the testing machines when the capacity of the application cluster is reduced such that the load capability of the application cluster reaches a capacity expansion threshold of the auto scaling.

In one embodiment, the apparatus further comprises a capacity adjustment unit, configured to adjust the capacity of the application cluster according to a planned data-handling capability of the application cluster.

Compared with current systems, the technical solutions in the disclosed embodiments provide the following advantages.

By setting up a simulated application cluster to be tested and performing an overall workload pressure test on multiple testing machines of the whole simulated application cluster, the disclosed embodiments can obtain a more accurate average single-machine capability of the machines that is closer to reality, thereby obtaining a more accurate capacity of the application cluster.

DETAILED DESCRIPTION OF THE EMBODIMENTS

To make the objects, features, and advantages of the disclosed embodiments more obvious and easy to understand, the embodiments are further described below in detail in conjunction with the accompanying figures and the specific implementation manners.

Figure 1:
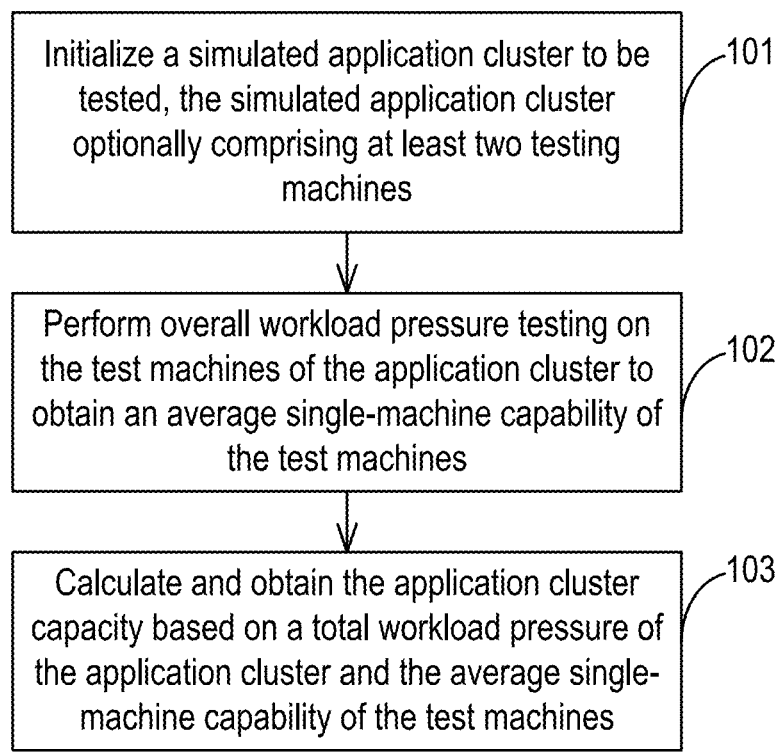
FIG. 1 is a flow diagram illustrating a method for obtaining a capacity of an application cluster according to some embodiments of the disclosure.

Referring to FIG. 1, a flow diagram illustrating a method for obtaining a capacity of an application cluster according to some embodiments of the disclosure is illustrated. The method may include the following steps.

Step 101: Initialize a simulated application cluster to be tested, the simulated application cluster optionally comprising at least two testing machines.

In one embodiment, an environment for measuring capacity percentages of multiple application clusters is prepared first; and one or more application clusters that require capacity measurement are determined from the multiple application clusters. When there is one application cluster, the application cluster may include at least two testing machines. When there is more than one application cluster, a single application cluster may include at least one testing machine. An apparatus for obtaining a capacity of an application cluster (briefly referred to as an apparatus) first correspondingly sets up a simulation environment in this step according to the determined application cluster that requires capacity measurement, i.e., setting up an application cluster identical to the application cluster that requires capacity measurement. One difference between the simulation environment set up by the apparatus and the actual application cluster may be that the application cluster in the simulation environment cannot provide access externally, and can only be used for capacity measurement.

Step 102: Perform overall workload pressure testing on the test machines of the application cluster to calculate an average single-machine capability of the test machines.

After the simulated application cluster to be tested is determined, overall workload pressure testing is performed on the testing machines of the application cluster. The workload pressure testing simulates a workload pressure regarding online traffic. Specifically, a workload pressure testing tool can be used to adjust and control traffic applied to the testing machines of the application cluster. The overall workload pressure testing process is performed simultaneously on multiple testing machines of the application cluster. Moreover, the manner may involve cooperative workload pressure testing of multiple application clusters, where the multiple application clusters have an invoking relationship therebetween, and the traffic for workload pressure testing also simulates the real online traffic. As such, the overall workload pressure test, when compared with the single-machine workload pressure testing, is closer to the reality.

In the process of the overall workload pressure testing, this embodiment can directly obtain capability limitations of multiple testing machines of the application cluster, and obtain the average single-machine capability of the testing machines through the average calculation. It is also possible to introduce an elastic platform during the process of workload pressure testing to perform capacity expansion or capacity reduction for the testing machines of the application cluster, thereby obtaining the average single-machine capability of the testing machines. For specific details, please refer to the description for the subsequent embodiments.

Step 103: Calculate and obtain the application cluster capacity based on a total workload pressure of the application cluster and the average single-machine capability of the test machines.

After the single-machine capabilities of the testing machines are obtained, the capacity of the application cluster can be obtained by calculation according to an estimated or preset total workload pressure value of the application cluster and the average single-machine capability of the testing machines. Specifically, the capacity of the application cluster can be obtained by dividing the total workload pressure value of the application cluster with the average single-machine capability of the testing machines. The total workload pressure value of the application cluster may be preset, and may also be estimated according to the existing methods, which are not specifically limited here. The obtaining of the total workload pressure value may have two situations: 1. in a situation where a preset target value exists; for example, if a target is 12 W, and a workload pressure testing is performed based on the 12 W; 2. in a situation where a target workload pressure value is not estimated, a workload pressure testing is mainly to see how much workload pressure that the current total machine resources can handle.

After the capacities of the multiple application clusters are obtained according to the above method, capacity percentages of the multiple application clusters can be further adjusted. After an elastic platform is integrated, the elastic platform will adjust the capacity percentage of each application cluster. When machine resources are limited, the capacity will be reduced if it is excessive and will be expanded if it is insufficient. Finally, each of the multiple application clusters will be adjusted, using an elastic platform, to a capacity percentage adapted to the current pressure.

By setting up a simulated application cluster to be tested and performing an overall workload pressure test on multiple testing machines of the whole simulated application cluster, the disclosed embodiments can obtain a more accurate average single-machine capability of the machines that is closer to reality, thereby obtaining a more accurate capacity of the application cluster.

Figure 2:
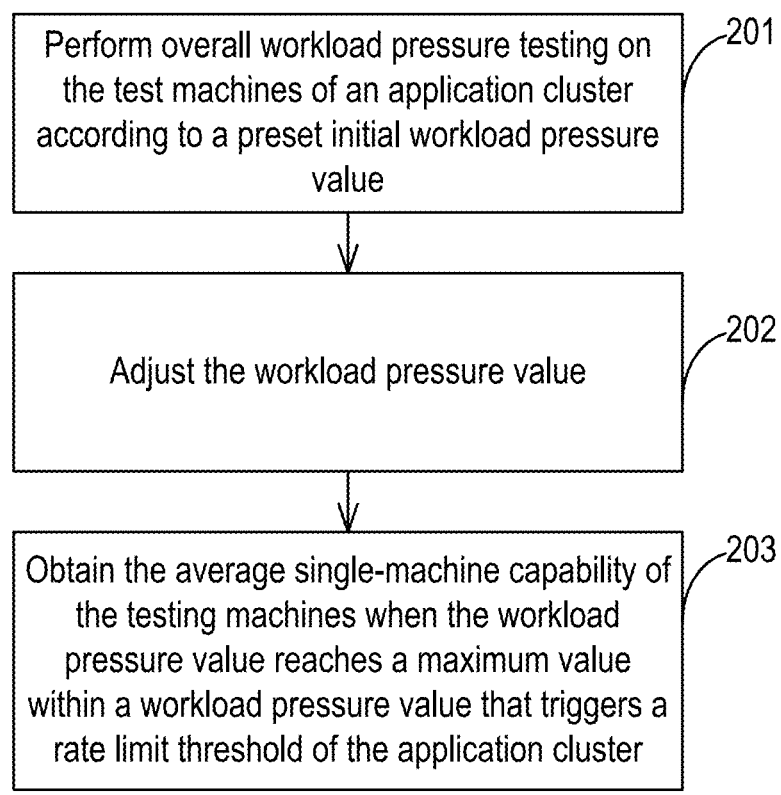
FIG. 2 is a flow diagram illustrating a method for performing an overall workload pressure testing on testing machines of an application cluster to be tested to obtain an average single-machine capability of the testing machines according to some embodiments of the disclosure.

In another embodiment, as shown in FIG. 2, a process of performing an overall workload pressure testing on testing machines of an application cluster to obtain an average single-machine capability of the testing machines may include the following steps.

Step 201: Perform overall workload pressure testing on the test machines of an application cluster according to a preset initial workload pressure value.

In this step, overall workload pressure testing can be performed on testing machines of a simulated application cluster to be tested using a workload pressure testing tool according to a preset initial workload pressure value, e.g., a user-designated initial workload pressure value.

Step 202: Adjust the workload pressure value.

If the initial workload pressure value is too small to trigger a rate limit threshold of the application cluster, the workload pressure value can be increased gradually. Specifically, the workload pressure value can be increased gradually according to a preset step length. If the initial workload pressure value is set to be excessively large which triggers the rate limit threshold of the application cluster, the workload pressure value can be reduced. When the workload pressure value is reduced, the workload pressure testing tool can reduce the workload pressure value gradually according to a preset step length.

The rate limit threshold of the application cluster is set according to an estimated limit of a workload pressure-handling capability of the application cluster. Exceeding the rate limit threshold indicates that the application cluster has reached the limit of the workload pressure-handling capability.

The workload pressure can be stabilized by adjusting the workload pressure value with the workload pressure testing tool, such that no rate limit will occur in the application cluster, nor will the workload pressure be excessively small.

Step 203: Obtain the average single-machine capability of the testing machines when the workload pressure value reaches a maximum value within a workload pressure value that triggers a rate limit threshold of the application cluster.

The average single-machine capability of the testing machines can be obtained when the workload pressure value adjusted by the workload pressure testing tool reaches the maximum value of the workload pressure value that triggers the rate limit threshold of the application cluster.

There are many manners of obtaining the average single-machine capability of the testing machines. Examples are given below.

Example 1

Calculation is done according to the maximum value of the workload pressure value. After the maximum value of the workload pressure value is obtained, the average single-machine capability of the testing machines can be obtained according to a ratio of the maximum value of the workload pressure value to the quantity of the testing machines included in the application cluster.

Example 2

Figure 3:
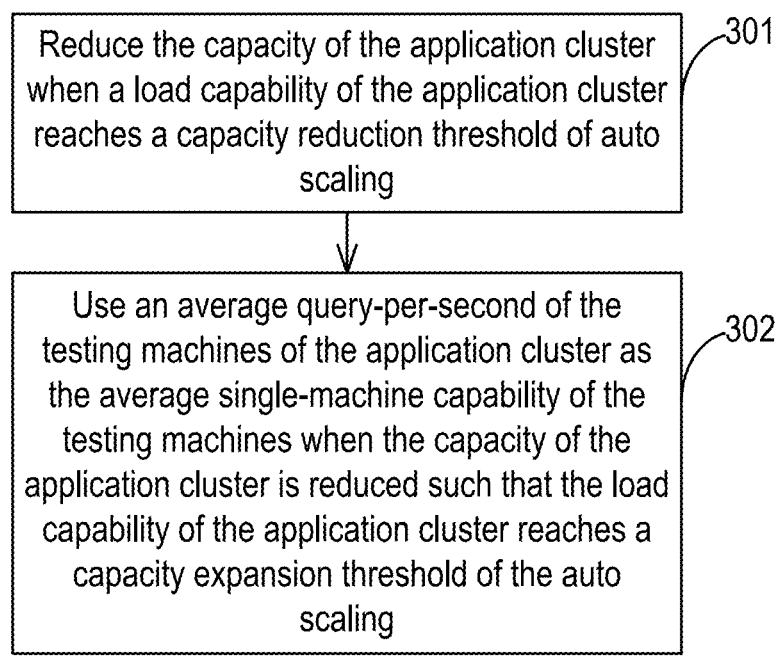
FIG. 3 is a flow diagram illustrating a method for obtaining an average single-machine capability of testing machines according to some embodiments of the disclosure.

In this example, as shown in FIG. 3, a process of obtaining the average single-machine capability of the testing machines may include the following steps.

Step 301: Reduce the capacity of the application cluster when a load capability of the application cluster reaches a capacity reduction threshold of auto scaling.

In this embodiment, auto scaling is a mechanism that dynamically adjusts the scale of the application cluster according to the load of an online application cluster. The mechanism not only can reduce costs, but it also can improve the stability of the online application cluster. In one example, the auto scaling can be implemented using an elastic platform. Specifically, when the workload pressure value reaches the maximum value of a workload pressure value that triggers the rate limit threshold of the application cluster, the elastic platform can be triggered to start. The elastic platform can then dynamically adjust the capacity of the application cluster according to the load of the online application cluster.

Specifically, the elastic platform will monitor the load capability of the application cluster, and may set a capacity reduction threshold and a capacity expansion threshold (the capacity expansion threshold=the rate limit threshold) of load. When the load capability of the application cluster reaches the capacity reduction threshold, the capacity of the application cluster needs to be reduced so the scale of the application cluster is reduced. When the load capability of the application cluster reaches the capacity expansion threshold, the capacity expansion needs to be performed so the scale of the application cluster is increased. For example, 80% of CPU load being the capacity reduction threshold may be set, and 90% of CPU load being the capacity expansion threshold may be set.

In this step, when it is monitored that the load capability of the application cluster reaches the capacity reduction threshold of the elastic platform, the apparatus reduces the capacity of the application cluster. Specifically, the capacity of the application cluster can be gradually reduced according to a preset capacity reduction ratio.

Step 302: Use an average query-per-second of the testing machines of the application cluster as the average single-machine capability of the testing machines when the capacity of the application cluster is reduced such that the load capability of the application cluster reaches a capacity expansion threshold of the auto scaling.

The load capability of the application cluster is increased after the capacity reduction. When it is monitored that the capacity of the application cluster is reduced such that the load capability of the application cluster reaches the capacity expansion threshold of the elastic platform, the average query-per-second of the testing machines of the application cluster at this time may be used as the average single-machine capability of the testing machines.

As can be seen from the above, the apparatus can dynamically adjust the capacity of the application cluster using the auto scaling according to the load of the online application cluster, which reduces the costs and improves the stability of the online application cluster.

After the average single-machine capability of the testing machines is obtained using the above method, the previous step 103 can be performed to calculate and obtain the capacity of the application cluster.

Figure 4:
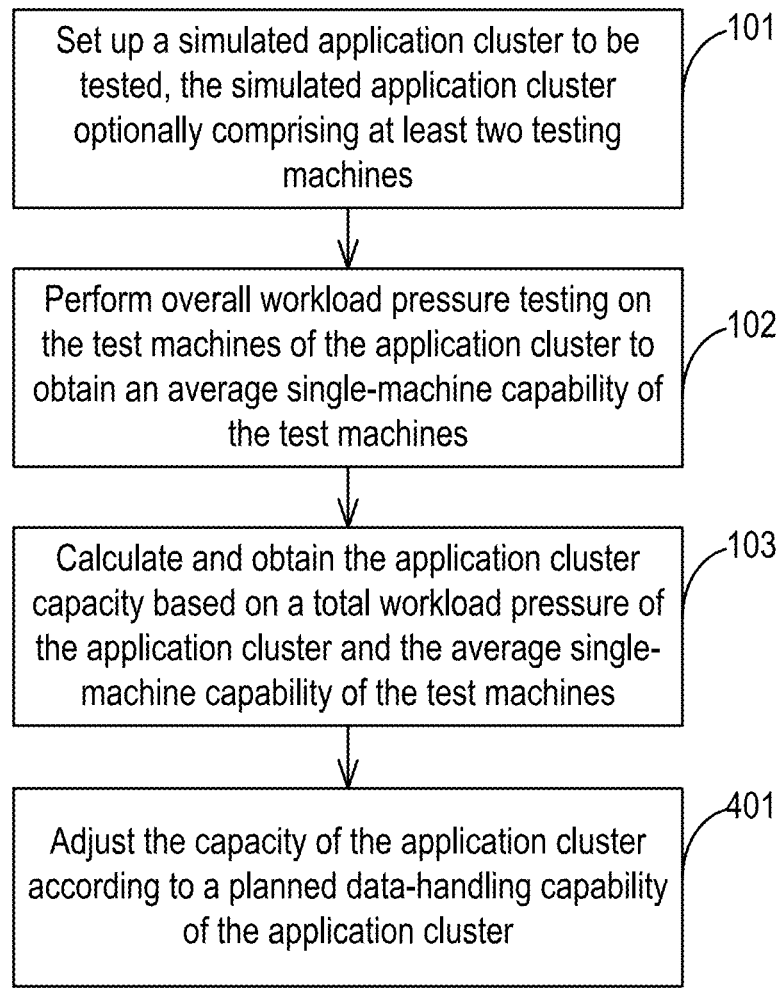
FIG. 4 is a flow diagram illustrating a method for obtaining a capacity of an application cluster according to some embodiments of the disclosure.

In another embodiment, as shown in FIG. 4, the method for obtaining a capacity of an application cluster may further include the following steps (in addition to step 101, 102, and 103 discussed in FIG. 1).

Step 401: Adjust the capacity of the application cluster according to a planned data-handling capability of the application cluster.

As an example, this embodiment can be applied to capacity preparation before a "mega" sale is about to happen. When a data-handling capability of the application cluster is planned in advance, the capacity of the application cluster can be adjusted according to the planned data-handling capability of the application cluster.

Specifically, the capacity of the application cluster can be adjusted according to a ratio of the planned data-handling capability (P) of the application cluster to the total workload pressure value (L) of the application cluster, so as to obtain an online environment capacity of the application cluster.

For example, the online environment capacity of the application cluster may be calculated according to the following formula:

$$\text{the online environment capacity} = \frac{P}{L} * \text{the obtained capacity of the application cluster}$$

The adjusting process can implement an automatic capacity preparation for the application cluster before the mega sale is about to take place.

In an optional embodiment, the method may further include: calculating a capacity percentage of a single application cluster within all of the application clusters after capacities of all the application clusters are obtained. Assuming that the quantity of the application clusters is 100, a proportion of the capacity of a single application cluster with respect to the capacity of all the application clusters may be calculated respectively to obtain the corresponding capacity percentage. As such, when the actual capacity of the planned application cluster cannot meet the requirement of the online environment capacity, the capacity of the single application cluster may be prepared according to the above capacity percentage. For example, an online environment capacity $C_i$ of the ith application cluster is obtained by calculation according to the above formula. An online environment capacity C of all the application clusters is further obtained by calculation, and then capacity can be prepared based on C. Assuming that an actual capacity R of a planned application cluster obtained by the preparation is less than C, allocation for capacity of the single application cluster may be performed based on R and the capacity percentage.

An example of the method for obtaining a capacity of an application cluster is provided here to enable those skilled in the art to better understand the disclosed embodiments. The example may include the following steps.

Step S1: Testing machines to be tested are selected and the testing machines are placed to an isolated simulation environment. Moreover, in the simulation environment, the testing machines may be grouped according to preset proportions, and the obtained workload pressure testing groups may be in one-to-one corresponding relationship with application clusters.

Step S2: Overall workload pressure testing is performed on the application clusters in the workload pressure testing groups using a workload pressure testing tool according to a pre-configured initial workload pressure value n.

Step S3: In the case that the initial workload pressure value is set to be excessively large which triggers a rate limit threshold of the application cluster, the workload pressure value can be gradually reduced using the workload pressure testing tool according to a preset step length. The preset step length may be s %, and the specific numerical value (s) of the preset step length is not limited in one embodiment.

Step S4: An elastic platform is started to adjust the capacity of the application cluster when the current workload pressure value reaches a maximum value within a workload pressure value which triggers the rate limit threshold of the application cluster.

Step S5: A load capability of the application cluster is monitored using the elastic platform, and a capacity reduction threshold and a capacity expansion threshold (the capacity expansion threshold=the rate limit threshold) of the load capability are set. In the case that none of the application clusters triggers the capacity expansion threshold, the capacity of the application cluster may be reduced to reduce the scale of the application cluster. When the capacity of an application cluster is reduced to a certain proportion, the load will inevitably reach the capacity expansion threshold of the elastic platform, and an average qps (Query-per-second) of the machines in the application cluster may be used as the average single-machine capability of the machines of the application cluster until average individual capabilities of the machines of all the application clusters are acquired.

The above load may include a CPU and a request response time (RT). By taking the CPU as an example, 80% may be set as a capacity reduction threshold thereof, and 90% may be set as a capacity expansion threshold thereof.

Step S6: The capacity expansion threshold of the elastic platform is identical to the rate limit threshold, and as the step length value of the capacity reduction may exceed that of the capacity expansion by several percentages, the above average single-machine capability of the machines may be finely adjusted by the capacity expansion to accurately calculate the capacity of the application cluster. The capacity expansion quantity=the overall workload pressure handled by the current application cluster/the average single-machine capability of the machines. Current capacities of the application clusters as well as a capacity percentage and a current pressure test flow L of a single application cluster are obtained after the fine adjustment on all the application clusters is completed.

Step S7: Capacity preparation before a mega sale takes place is performed. Specifically, the capacity of the application cluster can be adjusted according to a ratio of the planned data-handling capability (P) of the application cluster to the total workload pressure value (L) of the application cluster, so as to obtain an online environment capacity of the application cluster.

Step S8: The capacities of the applications are prepared one by one according to the online environment capacity of the application clusters. The capacity will be reduced if it is excessive and will be expanded if it is insufficient, so as to automatically implement the capacity preparation for the mega sale during the whole process. When the actual capacity of the planned application cluster cannot meet the requirement of the online environment capacity, the capacity of the single application cluster may be prepared according to the above capacity percentage.

It should be noted that in order to briefly describe the method embodiments, these embodiments are expressed as a combination of a series of actions. Those skilled in the art should know that the disclosed embodiments are not limited by the sequence of the described actions. Certain steps can be applied with different sequences or can be performed at the same time according to varying embodiments. Secondly, those skilled in the art should also know that all the embodiments described in the description are exemplary embodiments; the related actions are not necessarily needed for the embodiments.

Figure 5:
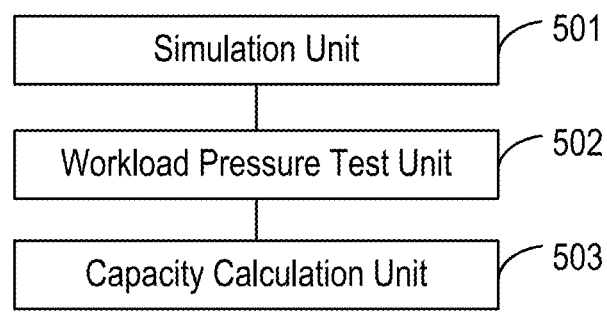
FIG. 5 is a block diagram of an apparatus for obtaining a capacity of an application cluster according to some embodiments of the disclosure.

Referring to FIG. 5, a block diagram of an apparatus for obtaining a capacity of an application cluster according to some embodiments of the disclosure is shown. The apparatus may include the following units.

A simulation unit 501 is configured to set up a simulated application cluster to be tested, the simulated application cluster optionally comprising at least two testing machines.

A workload pressure test unit 502 is configured to perform an overall workload pressure testing on the test machines of the application cluster to obtain an average single-machine capability of the test machines.

A capacity calculation unit 503 is configured to calculate and obtain the application cluster capacity based on a total workload pressure of the application cluster and the average single-machine capability of the test machines.

By setting up a simulated application cluster to be tested and performing an overall workload pressure testing on multiple testing machines of the whole simulated application cluster in the disclosed embodiments, the apparatus can obtain a more accurate average single-machine capability of the machines that is closer to reality, thereby obtaining a more accurate capacity of the application cluster.

Figure 6:
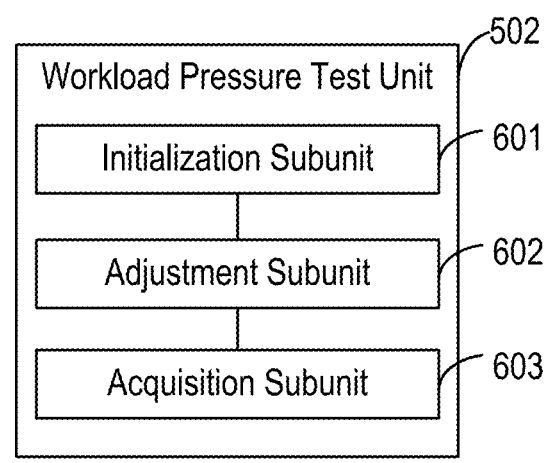
FIG. 6 is a block diagram of a workload pressure test unit according to some embodiments of the disclosure.

In another embodiment, as shown in FIG. 6, the workload pressure test unit 502 may include the following subunits.

An initialization subunit 601 is configured to perform an overall workload pressure testing on the test machines of the application cluster according to a preset initial workload pressure value.

An adjustment subunit 602, configured to adjust the workload pressure value.

An acquisition subunit 603 is configured to obtain the average single-machine capability of the testing machines when the workload pressure value reaches a maximum value within a workload pressure value that triggers a rate limit threshold of the application cluster.

The adjustment subunit 602 may be configured to reduce the workload pressure value according to a preset step length when the initial workload pressure value triggers the rate limit threshold of the application cluster.

Figure 7:
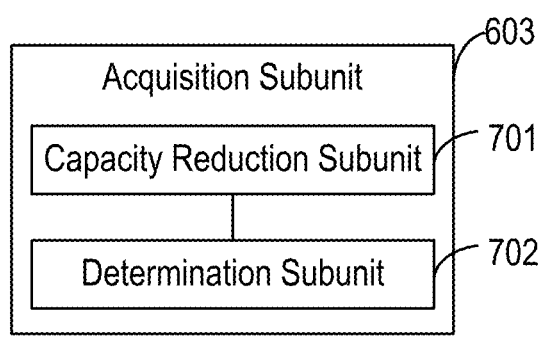
FIG. 7 is a block diagram of an acquisition subunit according to some embodiments of the disclosure.

In another embodiment, as shown in FIG. 7, the acquisition subunit 603 may further include the following subunits.

A capacity reduction subunit 701 is configured to reduce the capacity of the application cluster when a load capability of the application cluster reaches a capacity reduction threshold of auto scaling.

A determination subunit 702 is configured to use an average query-per-second of the testing machines of the application cluster as the average single-machine capability of the testing machines when the capacity of the application cluster is reduced such that the load capability of the application cluster reaches a capacity expansion threshold of the auto scaling.

The capacity reduction subunit 701 may be configured to gradually reduce the capacity of the application cluster according to a preset capacity reduction ratio.

Figure 8:
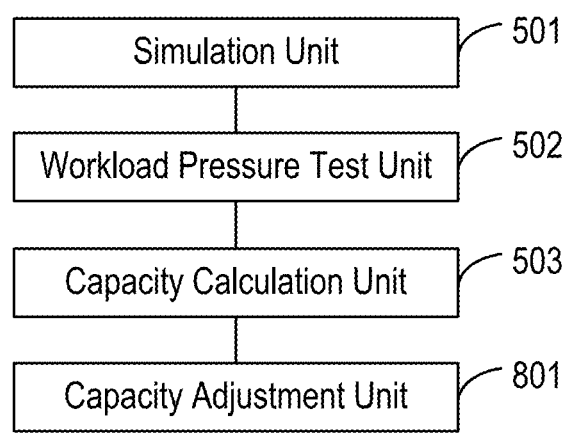
FIG. 8 is a block diagram of an apparatus for obtaining a capacity of an application cluster according to some embodiments of the disclosure.

In another embodiment, as shown in FIG. 8, the apparatus may further include the following units.

A capacity adjustment unit 801 is configured to adjust the capacity of the application cluster according to a planned data-handling capability of the application cluster.

The capacity adjustment unit 801 may be configured to adjust the capacity of the application cluster according to a ratio of the planned data-handling capability of the application cluster to the total workload pressure value of the application cluster.

The embodiments further provide an electronic device, including a memory and a processor.

The processor and the memory are interconnected using a bus. The bus may be an Industry Standard Architecture (ISA) bus, a Peripheral Component Interconnect (PCI) bus, an Extended Industry Standard Architecture (EISA) bus, or the like. The bus may be classified into an address bus, a data bus, a control bus, and the like.

The memory is configured to store a program. Specifically, the program may include program codes that include a computer operation instruction. The memory may include a high-speed RAM memory, and may also include a non-volatile memory, e.g., at least one magnetic disk memory.

The processor is configured to read the program codes in the memory to perform the following steps: setting up a simulated application cluster to be tested, the simulated application cluster optionally comprising at least two testing machines; performing an overall workload pressure testing on the test machines of the application cluster to obtain an average single-machine capability of the test machines; and calculating and obtaining the application cluster capacity based on a total workload pressure of the application cluster and the average single-machine capability of the test machines.

Because the apparatus embodiment is similar to the method embodiment, reference may be made to part of the description of the method embodiment for relevant parts.

The embodiments of this description are described progressively with each embodiment focusing on parts different from one another; and identical or similar parts of the embodiments may be learned by referring to one another.

Those skilled in the art should understand that the disclosed embodiments may be provided as a method, an apparatus or a computer program product. Therefore, the embodiments may be implemented as a complete hardware embodiment, a complete software embodiment, or an embodiment combining software and hardware. Moreover, the embodiments may be a computer program product implemented on one or more computer usable storage media (including, but not limited to, a magnetic disk memory, a CD-ROM, an optical memory, and the like) including computer usable program code.

In a typical configuration, a computer device includes one or more central processing units (CPUs), an input/output interface, a network interface, and a memory. The memory may include a computer readable medium in the form of a non-permanent memory, a random access memory (RAM) and/or a non-volatile memory or the like, such as a read-only memory (ROM) or a flash memory (flash RAM). The memory is an example of a computer readable medium. The computer readable medium includes permanent and non-permanent, movable and non-movable media that can achieve information storage by means of any methods or techniques. The information may be computer readable instructions, data structures, modules of programs or other data. For example, a storage medium of a computer includes, but is not limited to, a phase change memory (PRAM), a static random access memory (SRAM), a dynamic random access memory (DRAM), other types of RAMs, a ROM, an electrically erasable programmable read-only memory (EEPROM), a flash memory or other memory technologies, a compact disk read-only memory (CD-ROM), a digital versatile disc (DVD) or other optical storages, a cassette tape, a magnetic tape/magnetic disk storage or other magnetic storage devices, or any other non-transmission medium, and can be used to store information accessible to a computing device. In light of the definitions herein, the computer readable medium does not include transitory computer readable media (transitory media), such as modulated data signals and carrier waves.

The disclosed embodiments are described with reference to flow charts and/or block diagrams according to the method, terminal device (system), and computer program product according to the embodiments. It should be understood that a computer program instruction may be used to implement each process and/or block in the flowcharts and/or block diagrams and combinations of processes and/or blocks in the flowcharts and/or block diagrams. These computer program instructions may be provided to a general-purpose computer, a special-purpose computer, an embedded processor, or a processor of any other programmable data processing terminal device to generate a machine, so that the instructions executed by a computer or a processor of any other programmable data processing terminal device generate an apparatus for implementing a specified function in one or more processes in the flowcharts and/or in one or more blocks in the block diagrams.

These computer program instructions may also be stored in a computer readable memory that can instruct the computer or any other programmable data processing device to work in a particular manner, such that the instructions stored in the computer readable memory generate an artifact that includes an instruction apparatus. The instruction apparatus implements a specified function in one or more processes in the flowcharts and/or in one or more blocks in the block diagrams.

These computer program instructions may also be loaded onto a computer or another programmable data processing terminal device, such that a series of operation steps are performed on the computer or another programmable terminal device, thereby generating computer-implemented processing. Therefore, the instructions executed on the computer or another programmable terminal device provide steps for implementing a specified function in one or more processes in the flowcharts and/or in one or more blocks in the block diagrams.

Exemplary embodiments of the embodiments of the disclosure have been described; however, once knowing basic creative concepts, those skilled in the art can make other variations and modifications on these embodiments. Therefore, the appended claims are intended to be interpreted as including the exemplary embodiments and all the variations and modifications fall within the scope of the disclosure.

Finally, it should be further noted that in this text, relational terms such as first and second are merely used to distinguish one entity or operation from another entity or operation, and do not require or imply that the entities or operations have this actual relation or order. Moreover, the terms "include", "comprise" or other variations thereof are intended to cover non-exclusive inclusion, so that a process, a method, an article, or a terminal device including a series of elements includes not only the elements, but also other elements not clearly listed; or inherent elements of the process, method, article or terminal device may be further included. The element defined by the statement "including one", without further limitation, does not preclude the presence of additional identical elements in the process, method, article, or terminal device that includes the element.

A method for obtaining a capacity of an application cluster and an apparatus for obtaining a capacity of an application cluster provided in the disclosed embodiments are described in detail above; and the principles and implementations of the disclosed embodiments are described using specific examples in this text. The above descriptions on the embodiments are merely used to facilitating the understanding of the disclosure and core ideas thereof. Meanwhile, for those of ordinary skill in the art, modifications may be made on the specific implementations and application scopes according to the scope of the disclosed embodiments. In view of the above, the content of the description should not be construed as limiting the disclosed embodiments.

What is claimed is:
1. A method comprising:
   initializing, by a processing device, a simulated application cluster, the simulated application cluster comprising one or more testing machines;
   calculating, by the processing device, an average single-machine capability of each test machine, the calculating an average single-machine capability comprising:

performing, by the processing device, overall workload pressure testing on each of the test machines using a preset initial workload pressure value, adjusting, by the processing device, the workload pressure value, and calculating, by the processing device, the average single-machine capability of each of the testing machines when the workload pressure value reaches a maximum value triggering a rate limit threshold of the application cluster; and determining, by the processing device, an application cluster capacity based on a total workload pressure of the application cluster and the each average single-machine capability.

2. The method of claim 1, the adjusting the workload pressure value comprising reducing, by the processing device, the workload pressure value according to a preset step length when the initial workload pressure value triggers the rate limit threshold.

3. The method of claim 1, the calculating an average single-machine capability of each test machine comprising:
reducing, by the processing device, the application cluster capacity when a load capability of the application cluster reaches a capacity reduction threshold of auto scaling; and
using, by the processing device, an average query-per-second of each of the testing machines as the average single-machine capability of the testing machines when the application cluster capacity is reduced and the load capability of the application cluster reaches a capacity expansion threshold of auto scaling.

4. The method of claim 3, the reducing the application cluster capacity comprising gradually reducing, by the processing device, the application cluster capacity according to a preset capacity reduction ratio.

5. The method of claim 1, further comprising calculating, by the processing device, a capacity percentage of a single application cluster within a set of application clusters after capacities of all the application clusters are obtained.

6. The method of claim 1, further comprising adjusting, by the processing device, the application cluster capacity according to a planned data-handling capability of the application cluster.

7. The method of claim 6, the adjusting the application cluster capacity according to a planned data-handling capability of the application cluster comprising adjusting, by the processing device, the application cluster capacity according to a ratio of the planned data-handling capability of the application cluster to the total workload pressure value of the application cluster.

8. The method of claim 1, the initializing a simulated application cluster comprising:
identifying, by the processing device, an application cluster to simulate, the application cluster selected from a set of application clusters;
initializing, by the processing device, the simulated application cluster with at least two testing machines if the set of application clusters comprises a single application cluster; and
initializing, by the processing device, the simulated application cluster with a single testing machine if the set of application clusters comprises at least two application clusters.

9. The method of claim 1, the performing overall workload pressure testing on each of the test machines comprising simulating, by the processing device, online traffic to each of the test machines.

10. An apparatus comprising:
a processor; and
a storage medium for tangibly storing thereon program logic for execution by the processor, the stored program logic comprising:
logic, executed by the processor, for initializing a simulated application cluster, the simulated application cluster comprising one or more testing machines;
logic, executed by the processor, for calculating an average single-machine capability of each test machine, the calculating an average single-machine capability comprising:
performing overall workload pressure testing on each of the test machines using a preset initial workload pressure value,
adjusting the workload pressure value, and
calculating the average single-machine capability of each of the testing machines when the workload pressure value reaches a maximum value triggering a rate limit threshold of the application cluster; and
logic, executed by the processor, for determining an application cluster capacity based on a total workload pressure of the application cluster and the each average single-machine capability.

11. The apparatus of claim 10, the logic for adjusting the workload pressure value comprising logic, executed by the processor, reducing the workload pressure value according to a preset step length when the initial workload pressure value triggers the rate limit threshold.

12. The apparatus of claim 10, the logic for calculating an average single-machine capability of each test machine comprising:
logic, executed by the processor, reducing the application cluster capacity when a load capability of the application cluster reaches a capacity reduction threshold of auto scaling; and
logic, executed by the processor, for using an average query-per-second of each of the testing machines as the average single-machine capability of the testing machines when the application cluster capacity is reduced and the load capability of the application cluster reaches a capacity expansion threshold of auto scaling.

13. The apparatus of claim 12, the logic for reducing the application cluster capacity comprising logic, executed by the processor, for gradually reducing the application cluster capacity according to a preset capacity reduction ratio.

14. The apparatus of claim 10, further comprising logic, executed by the processor, for calculating a capacity percentage of a single application cluster within a set of application clusters after capacities of all the application clusters are obtained.

15. The apparatus of claim 10, further comprising logic, executed by the processor, for adjusting the application cluster capacity according to a planned data-handling capability of the application cluster.

16. The apparatus of claim 15, the logic for adjusting the application cluster capacity according to a planned data-handling capability of the application cluster comprising logic, executed by the processor, for adjusting the application cluster capacity according to a ratio of the planned data-handling capability of the application cluster to the total workload pressure value of the application cluster.

17. The apparatus of claim 10, the logic for initializing a simulated application cluster comprising:

logic, executed by the processor, for identifying an application cluster to simulate, the application cluster selected from a set of application clusters;

logic, executed by the processor, initializing the simulated application cluster with at least two testing machines if the set of application clusters comprises a single application cluster; and logic, executed by the processor, initializing the simulated application cluster with a single testing machine if the set of application clusters comprises at least two application clusters.

18. The apparatus of claim 10, the logic for performing overall workload pressure testing on each of the test machines comprising logic, executed by the processor, for simulating online traffic to each of the test machines.

* * * * *